| United States Patent [19] | [11] Patent Number: 4,777,059 |
| Tanaka et al. | [45] Date of Patent: Oct. 11, 1988 |

[54] PROCESS FOR PRODUCING VEGETABLE PROTEIN FOODS

[75] Inventors: Shigeru Tanaka; Masaaki Satoh; Gyota Taguchi, all of Yokohama, Japan

[73] Assignee: The Nisshin Oil Mills, Ltd., Tokyo, Japan

[21] Appl. No.: 938,297

[22] Filed: Dec. 5, 1986

[30] Foreign Application Priority Data

Dec. 7, 1985 [JP] Japan ............................... 60-275680

[51] Int. Cl.⁴ ............................................... A23J 1/14
[52] U.S. Cl. ..................................... 426/656; 426/104; 426/456; 426/506; 426/802
[58] Field of Search .............. 426/656, 516, 802, 496, 426/504, 506, 507, 104, 443, 456

[56] References Cited

U.S. PATENT DOCUMENTS 3,117,006 1/1964 Wenger .............................. 426/446
3,970,761 7/1976 Wenger et al. ...................... 426/656

FOREIGN PATENT DOCUMENTS 1071011 2/1980 Canada .............................. 426/656

*Primary Examiner*—Donald E. Czaja
*Assistant Examiner*—Celine T. Callahan
*Attorney, Agent, or Firm*—Sughrue, Mion, Zinn, Macpeak, and Seas

[57] ABSTRACT

A product obtained by subjecting an isolated soybean protein and corn starch used as the raw materials to pressing and heating treatments in a twin-screw extruder exhibits its fibrous properties when it is immersed in warm water to dissolve out a part of the corn starch and a little amount of the soybean protein. This product is relatively tough. The corn starch is dissolved out in only a small amount upon the immersion in warm water and, therefore, the yield is high.

4 Claims, No Drawings

PROCESS FOR PRODUCING VEGETABLE PROTEIN FOODS

BACKGROUND OF THE INVENTION

1. Field of the Invention

The present invention relates to a process for producing vegetable protein foods having excellent flavour, taste, appearance and fibrous properties.

2. Related Art Statement

Processes for producing foods having a meat-like texture by processing soybean proteins by means of an extruder to form the meat-like structure have been known from the specifications of Japanese Patent Publication Nos. 6203/1969, 16778/1970, 2024/1975 and 25532/1975. The inventors developed previously a process for producing vegetable protein foods having a high-density multilayer structure and an excellent meat-like texture characterized by adding a starch and an oil to a main raw material which is an isolated soybean protein or alcohol leached concentrated soybean protein (Japanese patent application No. 65305/1985).

The products produced by the process of Japanese patent application No. 66305/1985 (for example, a food produced by mixing isolated soybean protein with potato starch in a ratio of 7:3 and adding an oil thereto) are excellent food materials, since when they are reconstituted with hot water, the starch, and a litte amount of soybean protein are removed and the fibrous properties thereof are exhibited to realize the meat-like texture, particularly elastic mouth feel like those of dried cuttlefish or scallop due to their structures per se or intertwinning of the fibers. These products are excellent food materials. Another advantage is that a part of the starch remains in the structure after the reconstitution with hot water and, therefore, the seasoning and coloring can be effected easily.

However, when the food produced by said process has a high water content, the texture is insufficient frequently. Another defect is that the structure is slimy due to the presence of the starch. To overcome these defects, an additional treatment step was necessitated. For example, the product was washed thoroughly with water for removing the slime after the reconstitution with hot water or a coagulating agent such as calcium sulfate is added thereto in the course of the reconstitution. Thus, the workability of said process is not fully satisfactory yet.

SUMMARY OF THE INVENTION

An object of the present invention is to provide a process for producing a vegetable protein material which is relatively tough and which exhibits excellent fibrousness with a high yield of the solid.

The present invention relates to a process for producing fibrous vegetable protein foods characterized by comprising feeding main raw materials that are mixture of isolated soybean protein and corn starch in a twin-screw extruder together with water.

DETAILED DESCRIPTION OF THE INVENTION

The isolated soybean protein used in the present invention has a protein content of at least about 90% (by weight; the same shall apply hereinafter). The amount of the soybean protein is 45 to 80%, preferably 55 to 70%, based on the whole raw materials. The amount of the corn starch is 20 to 55%, preferably 30 to 45%, based on the whole raw materials. The intended effects can be obtained quite sufficiently by using the corn starch in the present invention. The amount of water added is preferably 20 to 40% based on the total of water and the raw materials. The object of the present invention can be attained by using any twin-screw extruder having the basic functions (such as high carrier and mixing abilities). The suitable end barrel temperature of the extruder is 130° to 180° C. The pressure just before the die is, for example, 30 to 80 kg/cm$^2$.

The following examples will further illustrate the present invention.

EXAMPLE 1

70 parts by weight of isolated soybean protein (trade mark: Sol-P K; a product of The Nisshin Oil Mills, Ltd.) was mixed thoroughly with 30 parts by weight of corn starch in a powder mixer and the mixture was introduced in a twin-screw extruder through a material-inlet by means of a quantitative feeder. Simultaneously, water was also introduced therein through a water-inlet of the extruder by means of a quantitative pump. The processing conditions in the extruder were as follows:

screw pattern: reverse screw provided at an end of the outlet
screw rotation rate: 100 rpm
end barrel temperature: 150° C.
pressure just before the die: 70 kg/cm$^2$
dies: two circular dies having a diameter of 7 mm
amount of water added: 16 l/h
feeding rate: 37.6 kg/h
twin-screw extruder: α-100 Extruder (a product of Suehiro Tekko-jo Co.)

The product obtained under these conditions was dried in a dryer to a water content of 5%. 200 g of the dried product was placed in a 110-mesh nylon bag and reconstituted with 10 times as much amount of warm water at 60° C. for about 50 min to obtain the intended protein food.

COMPARATIVE EXAMPLE 1

(process of Japanese patent application No. 65305/1985)

The same procedure as in Example 1 was repeated except that corn starch was replaced with potato starch and 9%, based on the raw material, of refined soybean oil was added thereto to obtain a protein food.

The properties of the two protein foods produced in the above examples are shown in Table 1.

TABLE 1

| Sample | Texture | Removal of slime | Yield of solid |
| --- | --- | --- | --- |
| Example 1 | suitable | not slimy and the washing with water was unnecessary | 88% |
| Comparative Example 1 | soft | washed with 10-times as much amount of water twice | 79% |

COMPARATIVE EXAMPLE 2

The same procedure as in Example 1 was repeated except that the weight ratio of the isolated soybean protein to the potato starch was altered to 70:30. The obtained protein food had an extremely low fibrousness and impractical.

According to the present invention, vegetable protein foods having a suitable fibrousness and excellent flavour and taste usable as excellent food material can be obtained.

Unlike the vegetable protein foods produced by a conventional process, the foods of the present invention have a suitable texture, necessitate no washing with water because they are not slimy and have a high yield of the solid.

What is claimed is:

1. A process for producing vegetable protein foods which exhibit fibrousness upon immersion in warm water, comprising feeding a mixture consisting essentially of isolated soybean protein and corn starch in a twin-screw extruder together with water at a pressure just before a die in the range of from 30 to 80 kg/cm$^2$, wherein the amount of corn starch in the mixture is 30 to 40 wt%.

2. A process according to claim 1, wherein the amount of the soybean protein in the mixture is 60 to 70 wt. %.

3. A process according to claim 1 wherein water is added in an amount of 20 to 40 wt. % based on the total of water and the mixture.

4. A process according to claim 1 wherein the end barrel temperature of the twin-screw extruder is 130° to 180° C.

* * * * *